United States Patent [19]

Sakakura et al.

[11] Patent Number: 5,761,526
[45] Date of Patent: Jun. 2, 1998

[54] APPARATUS FOR FORMING LOGICAL DISK MANAGEMENT DATA HAVING DISK DATA STRIPE WIDTH SET IN ORDER TO EQUALIZE RESPONSE TIME BASED ON PERFORMANCE

[75] Inventors: Takashi Sakakura; Shinya Fushimi, both of Tokyo, Japan

[73] Assignee: Mitsubishi Denki Kabushiki Kaisha, Tokyo, Japan

[21] Appl. No.: 629,842

[22] Filed: Apr. 10, 1996

[30] Foreign Application Priority Data

May 29, 1995 [JP] Japan ................... 7-130555

[51] Int. Cl.$^6$ ........................................... G06F 12/00
[52] U.S. Cl. .............. 395/821; 395/828; 395/878; 395/892; 395/497.01; 395/441
[58] Field of Search .......................... 395/821, 823, 395/828, 829, 830, 878, 892, 441, 497.01–497.04

[56] References Cited

U.S. PATENT DOCUMENTS

| | | | |
|---|---|---|---|
| 5,233,618 | 8/1993 | Glider et al. | 371/68 |
| 5,396,628 | 3/1995 | Kitsuregawa et al. | 395/675 |
| 5,442,752 | 8/1995 | Styczinski | 395/404 |
| 5,568,629 | 10/1996 | Gentry et al. | 395/441 |
| 5,572,661 | 11/1996 | Jacobson | 395/182.05 |
| 5,572,699 | 11/1996 | Kamo et al. | 395/441 |
| 5,613,085 | 3/1997 | Lee et al. | 395/441 |
| 5,615,190 | 3/1997 | Best et al. | 369/58 |
| 5,619,690 | 4/1997 | Matsumani et al. | 395/616 |
| 5,664,187 | 9/1997 | Burkes et al. | 395/621 |

*Primary Examiner*—Christopher B. Shin
*Attorney, Agent, or Firm*—Wolf, Greenfield & Sacks, P.C.

[57] ABSTRACT

A high-speed large quantity data transfer system is realized using a synchronous control means having striped disks in which a synchronizing cost between disks is reduced by software control, using time-out means, and using a data transfer means where user memory is not used. An input-output processing system for inputting and outputting a large quantity of data comprising a logical disk control means, the logical disk control means comprises a performance data collection means for collecting data, a logical disk construction means for constructing a logical disk apparatus using said plurality of disk apparatus, where said logical disk construction means forms logical disk management data so that the stripe width is set in order to equalize response time needed for input and output corresponding to one stripe data of each disk apparatus constructing said logical disk apparatus; and said logical disk control means controls said logical disk apparatus by said logical disk management data.

18 Claims, 9 Drawing Sheets

APPARATUS FOR FORMING LOGICAL DISK MANAGEMENT DATA HAVING DISK DATA STRIPE WIDTH SET IN ORDER TO EQUALIZE RESPONSE TIME BASED ON PERFORMANCE

BACKGROUND OF THE INVENTION

1. Field of the Invention

The present invention relates to an input-output processing system in a computer system, in particularly to an input-output processing system for inputting/outputting a large amounts of data in a high-speed.

2. Description of the Prior Art

In recent years, a disk subsystem called Redundant Array of Inexpensive Disks (RAID) spreads in personal computers and workstations, according to miniaturization and inclination for low prices of magnetic disk storage devices. RAID is a logical disk apparatus comprising a plurality of disk apparatus in order to improve performance and reliability. In general, any of construction systems divided into six levels, from RAID 0 level to RAID5 level, is adopted according to the purpose of use. Generally, RAID is realized as a function of disk controller and it is often realized as a function of SCSI host adaptor in a personal computer.

On the other hand, it is also known that a logical disk apparatus can be constructed by a plurality of disk apparatus controlled by a software instead of a hardware. Typical products using such technology are, such as, Logical Volume Manager of IBM company and Volume Manager of Veritas company. These products have functions such as disk concatenating, disk mirroring and disk striping. Some products are attempting to cover all of RAID functions.

In RAID system, RAID 3 level or a RAID 0 level is used in order to input and output rapidly a large quantities of data. A RAID 3 level is constructed as a byte interleave construction in which data layout construction has parity data to be added. RAID 0 level is equivalent to the disk striping by software where the parity data is not added to.

Two input-output performances could be expected by adopting disk striping and RAID. One improvement of input-output performance for users which is provided by allocating input-output requests to respective disk apparatus and operating these disk apparatus in parallel when a data size of input-output is requested which could contain a plurality of disk apparatus for interleave-arranged data. Another is an improvement of a through-put performance of a system which is provided by distributing the concurrent access to logical disk apparatus of a plurality of disk apparatus. In order to input and output rapidly a large quantities of data, the former improvement is pursued in the present invention.

By the way, although input and output for the logical disk apparatus constructed by stripe are distributed to respective disk apparatus, it is necessary to synchronize all inputs and outputs distributed to the logical disk apparatus for every input and output access. If there is a difference of processing time between respective logical disk apparatus operating in parallel, a waiting time is needed to finish the processing according to the difference. Therefore, it causes deterioration of input-output performance of a logical disk apparatus. For factors of disturbing the synchronization, there are performance differences of respective disk apparatus, a seek (positioning), dynamic performance differences caused by rotational waiting and que of data bus, and so on.

In order to decrease overhead of waiting time between disk apparatus in RAID system, for example, in a system to which RAID 3 level is applied, it is known that the system is constructed by homogeneous disk apparatus and all disk rotations are synchronized so as to avoid the disturbance of synchronization caused by rotational waiting of disks, and that sector positions which arrange data are shifted little by little so as to absorb a delay of input-output instructions to respective disk apparatus. However, this technique requires an assumption that RAID could be designed as a single hardware subsystem. (MICHELLE Y. KIM, "Synchronized Disk Interleaving", IEEE TRANSACTIONS ON COMPUTERS, VOL. C-35, NO. 11, NOVEMBER 1986)

Further, from more precise point of view, a prior art is disclosed in the laid-open Japanese patent publication No. 5-27910, where location gap correction of head of disk apparatus is regarded as a factor of disturbing synchronization between disk apparatus. In the prior art, when a location gap correction is needed in a certain reference disk, commands are instructed to every disk apparatus comprising disk arrays to perform location gap correction in order to minimize synchronization disturbance caused by location gap correction.

In the laid-open Japanese patent publication No. 5-257611, it is disclosed that a logical disk apparatus is realized in a flexible construction by software control in a RAID system. In other words, there is disclosed a data layout method, where logical disk apparatus having different RAID levels are mixed flexibly on one or a plurality of disk arrays, for partitioning of disk array, and performance deterioration by disturbing synchronization between disk apparatus is decreased.

As described above, a logical disk apparatus constructed by software control has been disclosed in the prior arts. But any logical disk apparatus has not been constructed based on a performance data obtained by measuring the disk apparatus comprising a logical disk apparatus in order to construct the most suitable logical disk apparatus.

The present invention provides an efficient input-output processing system to improve a through-put of the entire system. More concretely, the object of this invention is to improve the performance of input-output system by constructing the most suitable logical disk apparatus using ordinary disk apparatus instead of using RAID.

In processing a large quantities of data such as image data, input-output data quantity at one time becomes very large. In this case, the invention provides an input-output processing system which receives less data than specified quantity and can start its processing earlier, instead of waiting for all specified large quantity of data being transmitted entirely in response to one input-output instruction.

Further, the invention provides an input-output system which makes it possible to transmit data efficiently between input-output units.

SUMMARY OF THE INVENTION

According to one aspect of the invention, an input-output processing system for inputting and outputting a large quantity of data consisted of a logical disk control means, where the logical disk control means includes a performance data collection means for collecting data from performance data where performance characteristics of a plurality of disk constructing input-output system are given by a system manager or from direct measurement of the performance by operating the disk; a logical disk construction means for constructing a logical disk using all disks on the basis of performance data collected by the performance data collection means, where the logical disk construction means produces logical disk management data which sets width in order to equalize response time needed for input and output corresponding to one stripe data of each disk constructing the logical disk; and the logical disk control means controls the logical disks by the logical disk management data.

According to further aspect of the invention, the input-output processing system for inputting and outputting a large quantity of data, further comprises a time limit setting means for setting a limit time required to operate the input-output unit at sending input-output instruction to input-output units; and a means for completion of input-output operation which is started by the input-output instruction when the set time limit passed.

According to further aspect of the invention, the input-output processing system for inputting and outputting a large quantity of data of claim 2, further comprises
  a timer for setting time set by the time limit setting means;
    a means for completing input-output operation by receiving time expiration information from the timer.

According to further aspect of the invention, the input-output processing system for inputting and outputting a large quantity of data: wherein the input-output unit is a logical disk apparatus comprised of a plurality of disk apparatus.

According to further aspect of the invention, the input-output processing system for inputting and outputting a large quantity of data, further comprises a time limit setting means for setting limit time in relation to a processing of an input-output instruction at sending input-output instruction to input-output units; and a processing completion means for completing input-output operation which is started by the input-output instruction when the set time limit is expired.

According to further aspect of the invention, the input-output processing system for inputting and outputting a large quantity of data: wherein the performance measurement means performs an input-output instruction to measure the response time by setting conditions in which the response time for each disk apparatus is the shortest or longest.

According to further aspect of the invention, the input-output processing system for inputting and outputting a large quantity of data: wherein the performance measurement means carries out performance measurement of the disk apparatus as a part of initialization process to the disk apparatus when disk apparatus are added to the system.

According to further aspect of the invention, the input-output processing system for inputting and outputting a large quantity of data: wherein the performance data collection means collects bus performance data by construction of input-output bus which a plurality of disk apparatus are connected to, system construction data to which the system manager gives bus transfer performance, or actual operation of an input-output unit connected to the bus by the performance measurement means; the logical disk construction means constructs a logical disk apparatus on the basis of this collected performance data considering bus transfer performance connected to each disk performance.

According to further aspect of the invention, the input-output processing system for inputting and outputting a large quantity of data: wherein in the logical disk construction means, data transfer quantity for every input-output instruction assigned to disk apparatus comprising logical disk apparatus is arranged in one track of the disk apparatus.

According to further aspect of the invention, the input-output processing system for inputting and outputting a large quantity of data: wherein the logical disk construction means equalizes apparent input-output performance of a logical disk apparatus no matter where the data is placed on the disk apparatus, by alternate combination of inner and outer of circumferences of respective disk apparatus, if the logical disk apparatus is constructed by a plurality of homogeneous disk apparatus whose performance is different between inner and outer of circumferences.

According to further aspect of the invention, the input-output processing system for inputting and outputting a large quantity of data: wherein when an input-output request is sent to a logical disk apparatus, the logical disk control means dynamically judges the state of head position of disk apparatus shortly before sending an input-output instruction to every disk apparatus constructing the logical disk apparatus, and sends the input-output instruction so that a time for carrying out input and output to the logical disk apparatus becomes shortest.

According to further aspect of the invention, the input-output processing system for inputting and outputting a large quantity of data: wherein when an input-output request is sent to a logical disk apparatus using input-output size which a plurality of input-output requests generates to each of a plurality of disk apparatus; the logical disk control means judges performance characteristics of disk apparatus comprising this logical disk apparatus and characteristics of input-output bus which is connected to a disk, and decreases frequencies for sending a plurality of input-output instructions to the same disk apparatus, according to the necessity.

According to further aspect of the invention, the input-output processing system for inputting and outputting a large quantity of data: wherein when an input-output request is sent to a logical disk apparatus using input-output size which a plurality of input-output requests generates to each of a plurality of disk apparatus; the logical disk control means sends the input-output instruction so that the input-output time to the logical disk apparatus becomes shortest by arranging a synchronizing point in the input-output request to these plurality of disk apparatuses.

According to further aspect of the invention, the input-output processing system for inputting and outputting a large quantity of data: wherein the logical disk control means automatically constructs a logical disk apparatus which satisfies the performance given by the system manager.

According to further aspect of the invention, the input-output processing system for inputting and outputting a large quantity of data, further comprises a data transfer driver for carrying out data transfer control to input-output units, the data transfer driver carries out data transfer by ensuring two-face buffer on the system memory, when an apparatus for sending the input-output instruction includes a logical disk apparatus.

According to further aspect of the invention, the input-output processing system for inputting and outputting a large quantity of data, further comprises a bus arbiter for controlling input-output bus connected to an input-output unit; the bus arbiter comprises a source register and a destination register for registering data transfer source ID and data transfer destination ID, respectively; and the data transfer driver carries out data transfer without using system memory by driving the bus arbiter when an apparatus for sending the input-output instruction does not include a logical disk apparatus.

According to further aspect of the invention, the input-output processing system for inputting and outputting a large quantity of data: wherein the data transfer driver drives the bus arbiter by ensuring buffer for data transfer on the system memory, when there is difference of data transfer rate between input units and output units which are appointed by an input-output instruction.

According to further aspect of the invention, the input-output processing system for inputting and outputting a large quantity of data: further comprising a plurality of disk apparatus comprising the logical disk apparatus which are connected to different input-output buses to construct a plurality of logical disk apparatus, further comprising a copy means arranged between disk apparatuses connected to the same input-output bus at a disk control apparatus for controlling respective disk apparatus connected to the respective input-output buses, in order to carry out data copy between different logical disk apparatus.

BRIEF DESCRIPTION OF THE DRAWINGS

FIG. 1 shows an example of a hardware construction of a system which an input-output processing system of the present invention is applied to.

FIG. 2 shows another example of a software construction of a system which an input-output processing system of the present invention is applied to.

DETAILED DESCRIPTION OF THE PREFERRED EMBODIMENTS.

EMBODIMENT 1

Figure 1:
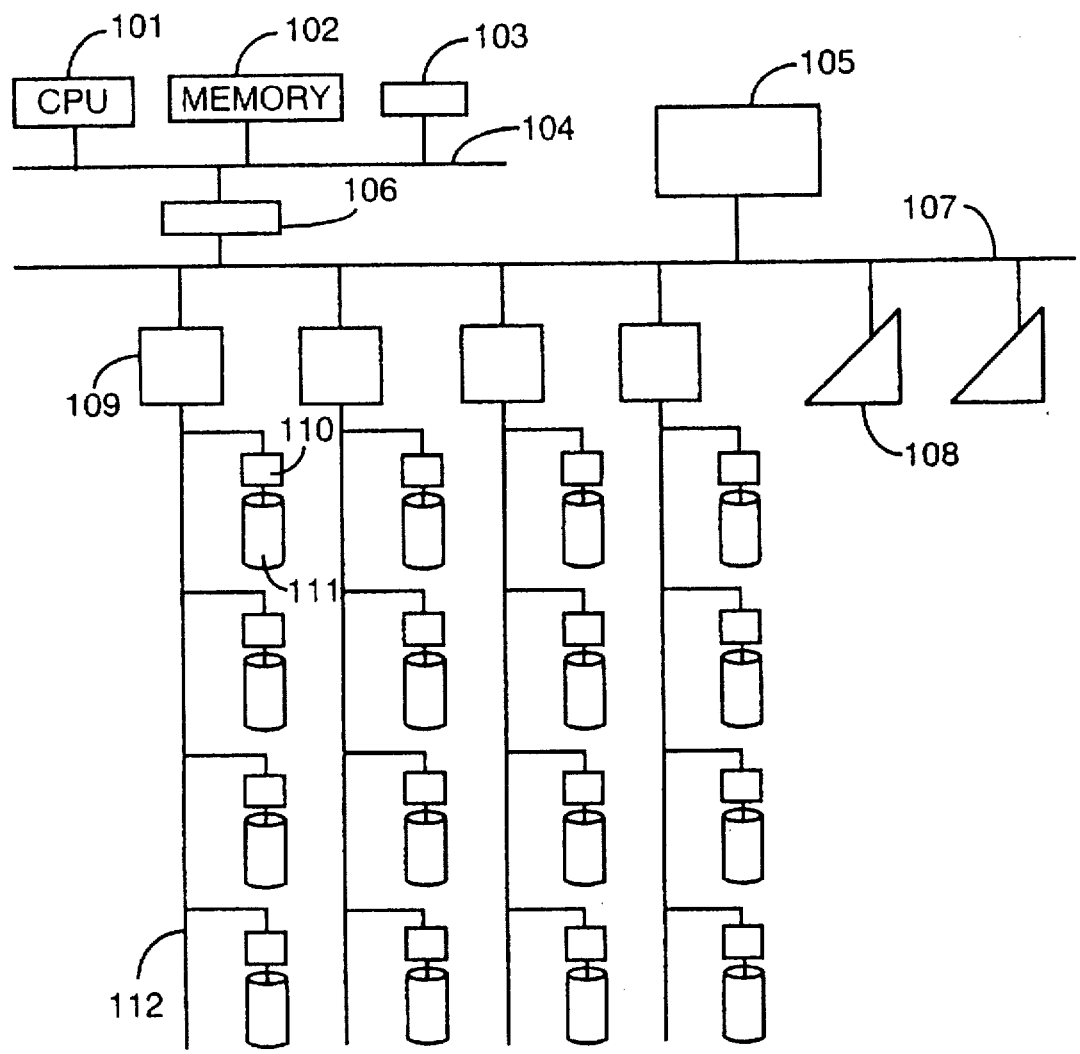

FIG. 1 shows a construction of hardware system which the present invention is applied to. In FIG. 1, a CPU (central processing unit) 101 carries out processing of the whole system, a memory 102 stores instructions and data which CPU 101 processes, and a system timer 103 measures the time. These units are respectively connected to a memory bus 104.

Memory bus 104 is connected to a local bus (main input-output bus) 107 through a bridge 106. This local bus 107 is controlled by a bus arbiter 105. Four SCSI bus adapters 109 each having DMA controller and a high-speed device 108 are connected to local bus 107, where the SCSI bus adaptor 109 is connected a SCSI bus 112, respectively. This high-speed device 108 has a DMA interface. For example, the high-speed device 108 instantaneously processes a large quantity of data transmitted from a disk apparatus, like a sort processor, and outputs the processing result again to the disk apparatus.

Further, four disk apparatus 111 having the same constructions are connected to each SCSI bus 112 through a disk controller 110.

In this embodiment, the same disk apparatus are used as disk apparatus 111, but, naturally, different kinds of disk apparatus may be connected to each SCSI bus 112 through a disk controller 110.

Figure 2:
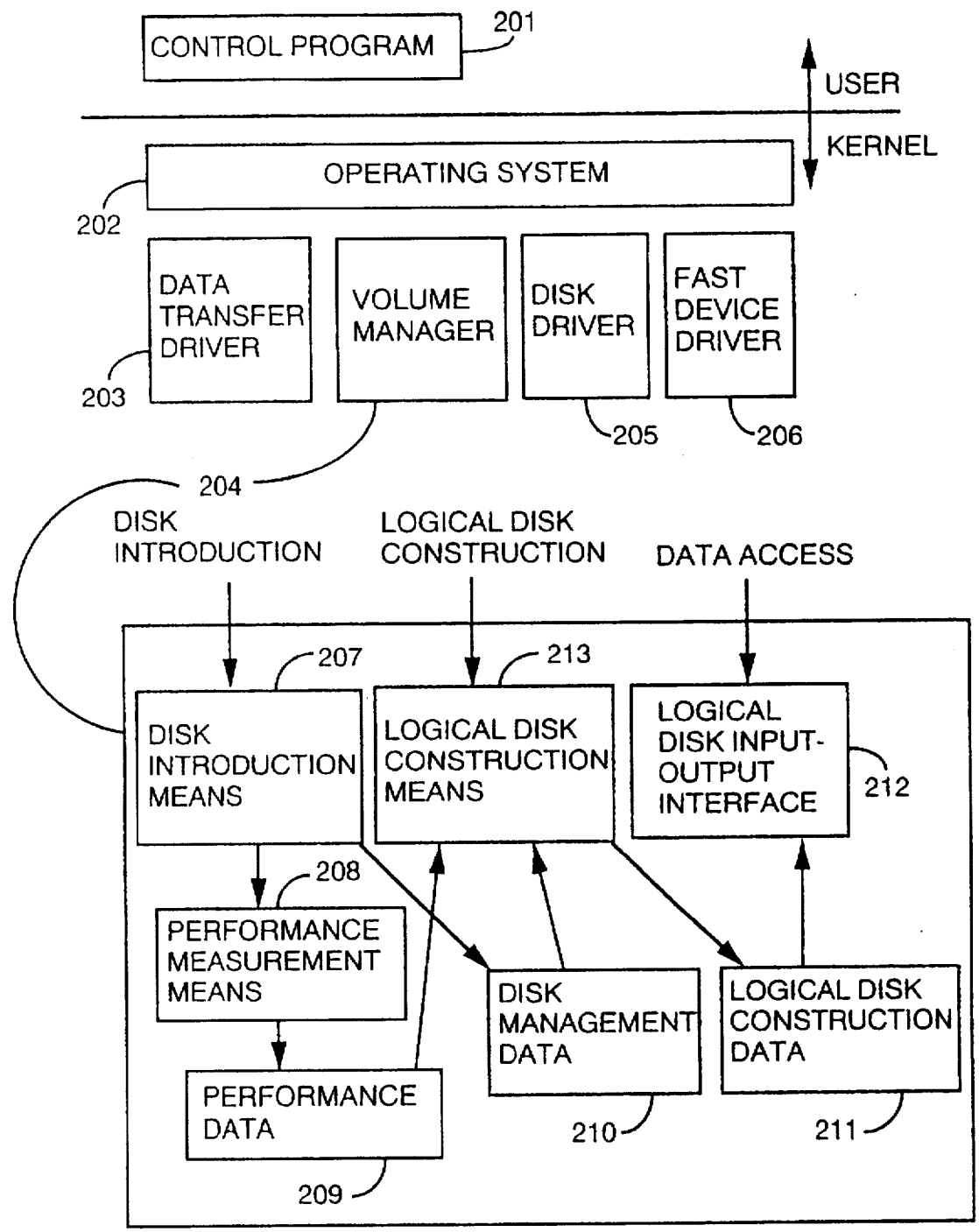

FIG. 2 shows a software construction of the present invention. In FIG. 2, a control program 201 carries out data transfer from a logical disk apparatus to high-speed device 108, or adversely, from high-speed device 108 to disk apparatus 111 or logical disk apparatus. This control program 201 operates as a user application program. In this embodiment, an operating system 202 is mainly used for a frame work, and functions of its operating system are hardly used. Control program 201 substantially requests a data transfer driver 203 to control the data transfer. In other words, the control program 201 only instructs to write data of 30 MB from an offset 1 MB of device A to device B. Data transfer driver 203 is incorporated into a kernel as a pseudo driver. A volume manager 204 constructed by a logical disk apparatus using a plurality of disk apparatus by software control, which excludes an overhead, and obtains shorter response time, in other words, more high-speed and a large quantities of data transfer, or a confirmed response in a certain limited time (this volume manager 204 constructs a part of a logical disk control means). A disk driver 205 (a part of a logical disk control means) controls disk apparatus 111. A device driver 206 (a part of a logical disk control means) controls the high-speed device 108. When a data transfer function of bus arbiter 105 is utilized, data transfer driver 203 carries out control function directly. The logical disk control means controls not only a logical disk apparatus but also input-output units other than a logical disk apparatus.

Here, a function of volume manager 204, which is the most important function of the present invention, is explained as follows. Volume manager 204 provides a logical disk apparatus having larger consecutive data area than that of an actual disk apparatus by constructing a logical disk apparatus comprised of a plurality of disk apparatuses, provides a disk mirroring where the data being written to a logical disk apparatus are written to a plurality of disk apparatus, and also provides high-speed performance of input-output by a stripe construction of the logical disk apparatus. In other words, volume manager 204 constructs a logical disk apparatus using disk apparatus under the control of volume manager 204 according to the instructions of a system manager. A user accesses the logical disk apparatus without any direct access to the disk apparatus controlled by volume manager 204. Naturally, a system manager need not put every disk apparatus under the control of volume manager 204.

Further explanation as to volume manager 204 is as follows. Volume manager 204 comprises a disk introduction means 207 which introduces a disk apparatus into a system, a disk management data 210 which is composed of a disk label, which is read by disk introduction means 207 from a disk apparatus when a disk is introduced, and a disk attribute file of the system, a performance measurement means which measures performance of a disk apparatus which is started by the disk introduction means, a performance data 209 measured by the performance measurement means, a logical disk construction means 213 which generates a logical disk construction data from the performance data 209 and the disk management data 210, and a logical disk input-output interface which conducts interface when accessing the logical disk apparatus using logical disk construction data generated in the logical disk construction means 213.

Here, a technique called disk striping is summarized as follows. To make it easily understood, assuming that two completely equivalent disk apparatus are connected to an input-output bus which is high-speed enough. Consecutive large quantities of data having a certain size is divided to be a size of, for example, 128 sectors (this quantity of data unit is called 'chunk', hereafter). Chunks are stored alternately in respective disk apparatus in order from the first. When an input-output instruction for two-chunk input-output size is requested at the top of logical disk apparatus constructed by stripe, the input-output request is distributed into two disk apparatuses and processed. Therefore, apparent input-output performance becomes double.

It is explained in the following example that a system manager needs a disk apparatus whose performance is twice as good as a usual disk apparatus, and realizes it by utilizing two usual disk apparatuses and the volume manager 204. A system manager introduces the volume manager 204 into a system. The volume manager 204 gives an instruction for introducing two new disk apparatus to the disk introduction means 207, and registers it under control of volume manager 204. Receiving the request for registration, the volume manager 204 initializes the disk apparatus 111 and writes a management metadata (logical disk management data 210) to the disk apparatus 111 for constructing a logical disk apparatus. At this state, a logical disk apparatus is not constructed yet. Further, the system manager requests the logical disk construction means 213 to construct a logical disk apparatus constructed by stripe in the volume manager 204 using two disk apparatus. Logical disk construction means 213 forms logical disk management data 211, thereby, a user is enabled finally to utilize a logical disk apparatus. When a user accesses to the logical disk apparatus, he accesses to a logical disk input-output interface 212 through the operating system 202. Receiving the input-output request, volume manager 204 refers to logical disk construction data in the logical disk apparatus, and gives an input-output instruction to an actual disk apparatus 111 which comprises a logical disk apparatus.

Operations of this input-output processing system are explained orderly below. To begin with, a performance measurement of a disk apparatus unit and a measurement of bus efficiency are explained, which are carried out when a disk apparatus is introduced into a system.

First, they are summarized as follows. These measurements carry out assumption of response performance according to the input-output size of disk apparatus, response performance according to disk address and disk cash effect and so on, by using performance measurement means 208 (a part of performance data collecting means), to know performance features of respective disk apparatus constructed by stripe. Concretely, input-output operation of the disk apparatus is carried out using the parameters, and a response time (a part of performance data 209) is measured and the result is recorded. On the basis of performance data 209 of the respective disk apparatus, data quantities which should be allocated for respective disk apparatus, that is, a stripe width is determined in order to make each response time equal which is required for input-output data of one stripe of disk apparatus comprising a disk stripe. According to the resultant data, the logical disk construction means 213 constructs the logical disk construction data 211, that is, a logical disk apparatus of striping construction. Input-output requests to the logical disk apparatus of such a construction are distributed to respective disk apparatus comprising a stripe. Respective input-output units equally responses in every certain time. Therefore, roughly speaking, apparent response time is reduced to a ratio of one to the number of disk apparatus constructing stripes, in comparison with the response time for merely inputting-outputting to disk apparatus.

Figure 3:
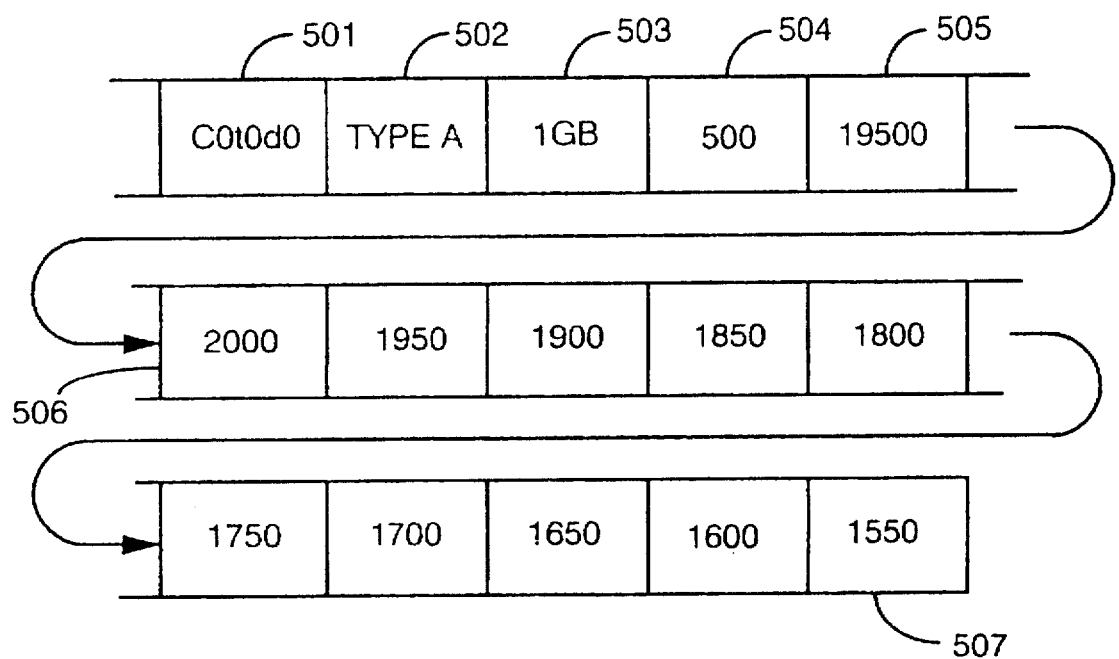
FIG. 3 shows an example of performance data of a disk provided by a performance measurement means of the present invention.

Volume manager 204 judges whether requested performances of the logical disk apparatus are ensured or not, when a logical disk apparatus construction is requested by a system manager, on the basis of this measured performance data 209. Introduction of disk apparatus is carried out by a instruction of format (initialization), after starting up the system after disk apparatus is connected, and then after confirmation of disk connection. By using format data as writing data, disk performance measurement and initialization of a disk apparatus can be both carried out. It does not carry out a mere format but also metadata (disk management data 210) is written so that the disk apparatus is controlled under the volume manager 204. FIG. 3 shows a result of performance measurement which is carried out to disk apparatus 111. The numerals in FIG. 3 show the above mentioned metadata which are stored in the disk apparatus. In other words, they are referred to as a snapshot.

In FIG. 3, a reference name 501 specifies the disk apparatus 111 in a system, index information 502 specifies the type of disk apparatus 111. The volume manager 204 obtains this information by reading out the data base, given by a system manager, which are included in catalogue data relating to disk apparatus 111, or by reading out label information of disk apparatus 111. This information tells disk rotation speed and the number of sectors per one truck on each cylinder. In FIG. 3, the numeral 503 denotes capacity of disk apparatus 111, the numeral 504 denotes an access time without seek and rotational waiting time, and the numeral 505 denotes an access time indicated in micro second when seek is carried out from the far most distant position with one rotational waiting time. This measurement is carried out by measuring the pass time between the completion of access to the reference position and the completion of access to the next sector or the far most distant sector. Ten data from 506 to 507 expresses bit numbers in KB/S which are obtained by measuring transfer rate at the positions from zero cylinder in every 100 MB. These disk performance data 209 is referred to or utilized when logical disk is constructed as explained later. It is assumed that there is no difference between reading performance and writing performance for the disk apparatuses which are used in this embodiment.

In general, when a new disk apparatus is introduced into a system, a process called format is carried out for finding bad sectors and writing label information. In this embodiment, this format process may be carried out at the same time with a process for collecting performance data 209 of a disk apparatus by performance measurement means 208, as described above. Therefore, necessary cost for measurement performance could be reduced, and a burden of system manager could also be reduced.

The following is the explanation about measurement of through-put performance of an input-output bus. The object of this measurement is to construct a logical disk, considering an input-output performance of disk apparatus, a data transfer performance (a part of performance data 209) of input-output bus which could be a factor to prevent synchronization operation, and a conflict on the same bus. Input-output units including all disk apparatus respectively connected to a plurality of input-output buses are combined to be driven and be loaded. The response time of input-output operation of each input-output unit is measured. Thereby, it is known if there is any redundant ability for transferring data at each input-output bus and also at higher hierarchy input-output buses to which the former input-output bus is connected, or what the limit value of the transfer ability is. A logical disk apparatus is constructed by selecting a disk apparatus constructed by stripe, in order to avoid a data transfer ability limitation of common input-output bus by a data transfer of disk apparatus operating in parallel. Thereby, performance deterioration caused by input-output bus neck when data are inputted and outputted to a logical disk apparatus, can be avoided.

Accordingly, this measurement defines not only a mere through-put performance but also conditions of input-output bus conflict generation to an input-output unit connected to a measurement object bus according to the starting order, and actually generates a bus conflict to measure input-output latency of each input-output unit. Thereby, it is possible to know bus arbitration policy and to insert a starting delay in order to avoid unnecessary bus conflict generated at starting the input-output of disk apparatus comprised of the stripes. In this embodiment, however, through-put performance of SCSI bus 112 and local bus 107, to which a disk apparatus is connected, is measured, and the stripe is constructed not to exceed the limit of the through-put performance of each input-output bus at accessing input and output of the logical disk apparatus comprised of stripes. Regarding SCSI bus 112, the limit value of the through-put performance can be obtained by running all input-output units connected to the bus 112 (the same four disk apparatuses are connected to SCSI bus 112 in the same way in this embodiment), and by calculating total amount of input-output data obtained within a certain period of time. By comparing the total amount obtained in the above processes with the through-put performance in case that one disk apparatus operates, we know how many disk apparatuses can operate without being limited by bus transfer rate. In this embodiment, since the maximum transfer rate of the disk apparatus is 2 MB/s and the maximum transfer rate of SCSI bus 112 is 8 MB/s, the operation is not simply limited by bus transfer rate if the four disk apparatus connected to SCSI bus 112 operate at the same time.

Similarly, according to measurement of transfer rate of local bus 107 by operating every disk apparatus and the high-speed device 108, it is known that the transfer rate corresponds to the total of transfer rate of all input-output units at 40 MB/s. Eventually, no matter how input-output operation is carried out to every input-output unit, a construction of an input-output bus and an input-output unit of this embodiment is not limited by transfer rate of the input-output bus.

However, if it is different from this embodiment, for example, if transfer rate of SCSI bus is slower than the transfer rate of SCSI bus of this embodiment, and only two disk apparatuses can operate by the transfer rate of SCSI bus at the maximum transfer rate of the disk apparatus, more than three disk apparatuses which comprise the same logical disk apparatus constructed by stripe could not be constructed by disk apparatus connected to the same SCSI bus.

Figure 4:
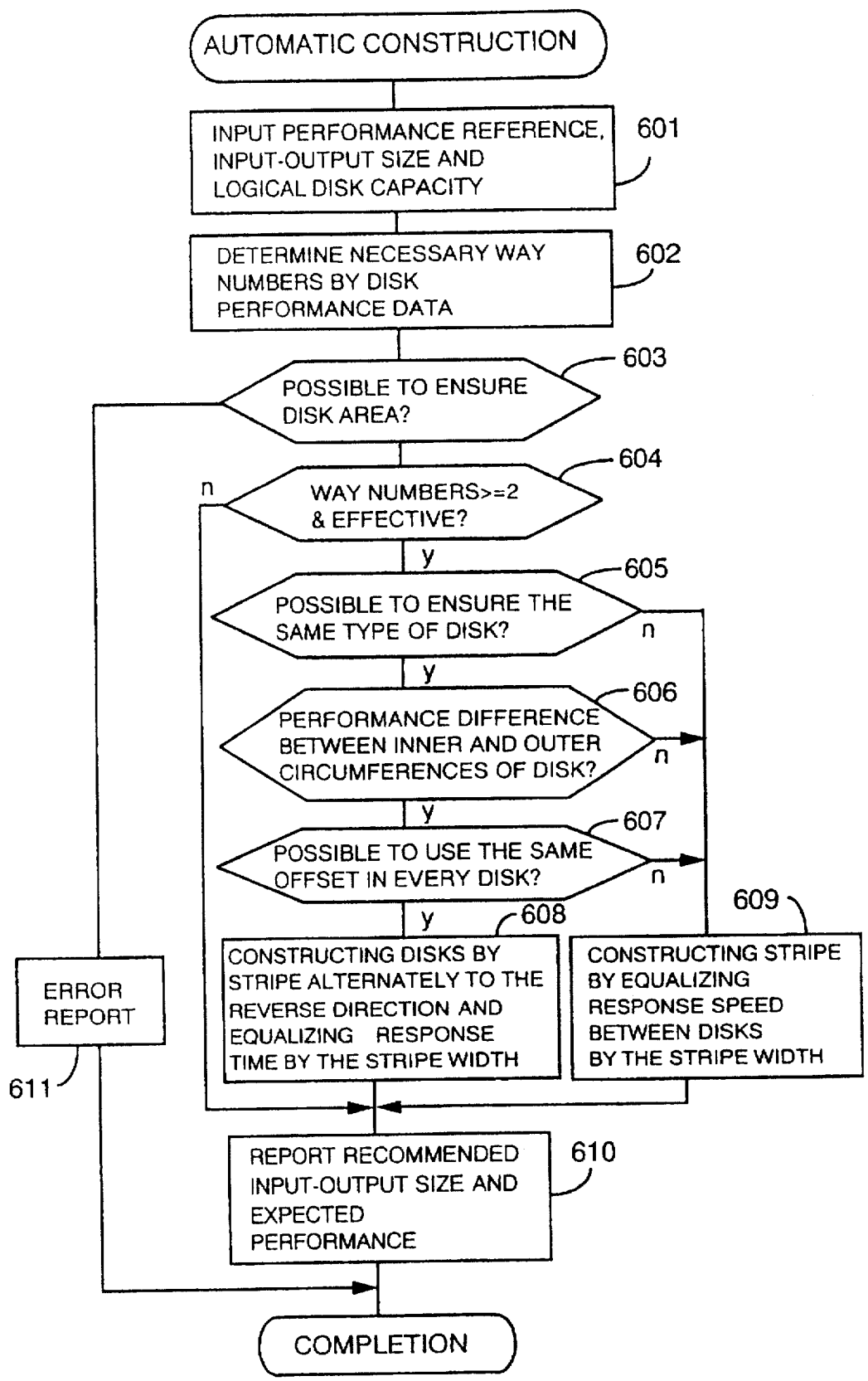
FIG. 4 shows a flowchart of processes to construct a logical disk apparatus automatically which is carried out by a volume manager of the present invention.

Next, a construction method of a logical disk apparatus is explained as follows. FIG. 4 shows a flow chart which explains operations of a logical disk construction means 213 comprising a logical disk apparatus constructed by stripe. The method is explained referring to FIG. 4. In step 601, a user, in other words, a system manager inputs necessary logical disk apparatus performance of stripe construction, for example, 8 MB/S, input-output size which an application program outputs in case of accessing the logical disk apparatus, for example, 512 KB, and necessary size of the logical disk apparatus, for example, 1 GB. Thereby, this input-output processing system tries to construct a logical disk apparatus which satisfies a specification. Here, the input-output size is specified in order to restrict the number of stripes and stripe width. In other words, performance improvement by disk striping can not be obtained if an input-output size is not a multiple of the above mentioned chunk size.

In step 602, the necessary number of disk apparatus which operate in parallel to achieve performance of an appointed logical disk apparatus, in other words, the WAY number of stripe is determined, according to the performance data 209 of disk apparatus obtained by the performance measurement means 208. After the determination of the WAY number, vacant areas on the disk apparatus which is controlled by this input-output processing system is searched at step 603, and determines whether it is possible to construct stripes on the disk apparatus which is different by necessary WAY numbers. However, disk striping is not always needed in order to satisfy the appointed performance reference. If it is not necessary, vacant areas are simply searched on the disk apparatuses. After then, at step 604, it is judged by the given input-output size if there is any effects in performance, or if the requested performance reference does not need any disk striping, when constructing a logical disk apparatus having stripe construction, whose chunk size is equal to the input-output size. In case of no effect in performance is found by the constraint of stripe width, or no disk striping is necessary, disk areas are reserved and an expected performance of logical disk apparatus is reported to a user at step 610 before completion.

When disk striping of more than two WAYs is effective, it is judged at step 605 if there is any possibility of stripe construction by the same kind of disk apparatus. If it is possible, it is judged at step 606 if there is any performance difference between inner and outer circumferences of disk. If there is performance difference between inner and outer circumference of disk, it is judged at step 607 if there is any possibility of using disk apparatus, which constructs stripes, from the same offset position. If it is possible to use from the same offset position, disk apparatus are constructed by stripe alternately to the reverse direction at step 608. If the result is no as indicated "n" at step 605, step 606 and step 607, the stripe is constructed in order to equalize the response speed of respective disk apparatus by stripe width, at step 608.

Operations in step 609 is further supplementarily explained as follows. Disk striping is constructed as follows. First, chunk size is determined. An input-output size is regarded as chunk size unless the appointed input-output size is larger than the amount of stripe width necessary to achieve logical disk apparatus performance. On the other hand, when an input-output size is too large, input-output size divided by natural number is regarded as chunk size according to the necessity. Now, assume that 512 KB is appointed for input-output size. In this case, for example, chunk size becomes 128 KB, which is a quarter of 512 KB, if it is possible to achieve performance by 4 WAYs of average 32 KB stripe width. Data transfer rate at the position of disk apparatus constructing stripes is obtained from performance data 209 of disk apparatus which is already obtained. The chunk is divided by the inverse ratio of the data transfer rate to get the stripe width. Thereby, response time of disk apparatus constructing respective stripes is averaged when input-output operation is carried out to the logical disk apparatus.

Next, supplementary explanation of operations in step 608 is as follows. Disk striping in step 608 is constructed as follows. In this case, chunk size and stripe width of each disk apparatus are also determined first. Stripes are constructed alternately from the top and from the end of the same usage area of disk apparatus constructed by stripe of even number.

The stripe width is equivalent to one track width. The size of one track at the head position and the tail position is known by the number of sectors included in the tracks at the position shown by performance information 502 of disk apparatus, and chunk size is determined such as (size of the head track+size of the tail track)×(number of stripe WAYs/2). Accordingly, the stripe width is equivalent to the size per track at the time of input and output.

When logical disk construction data 211 for constructing a logical disk apparatus is generated and registered as described above, performance of this logical disk apparatus, which can be expected to be recommended input-output size, in other words, chunk size determined inside, is reported at step 610 before completion. When disk striping is not necessary according to performance level and input-output size given beforehand or when improvement of performance is not expected, necessary input-output size which satisfies the given performance level and a single disk performance is reported to a single disk apparatus.

Figure 5:
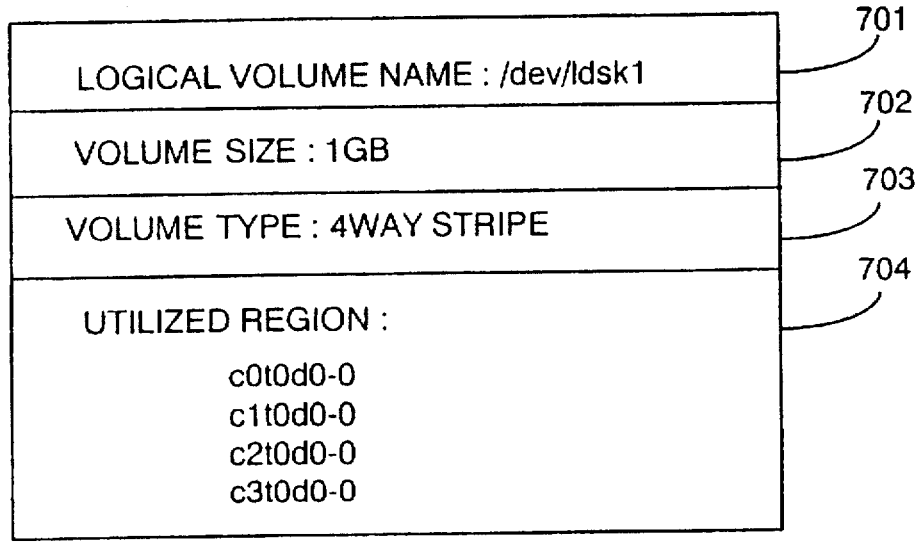
FIG. 5 shows an example of logical disk management data of the present invention.
Figure 6:
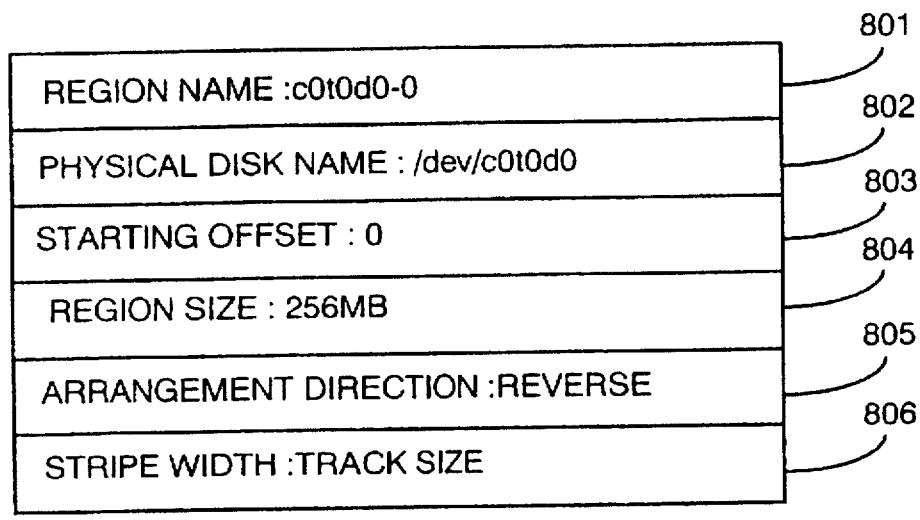
FIG. 6 shows an example of logical disk construction data of the present invention.

FIG. 5 and FIG. 6 show partial management information of a logical disk apparatus as constructed described above and respective stripe-constructed disk apparatus comprising a logical disk apparatus. The copies of these management information are stored as metadata on every disk apparatus 111 controlled by this input-output processing system, and are read on memory 102 controlled by this input-output processing system according to the necessity. FIG. 5 and FIG. 6 show general tabular formats for convenience. But these information are stored on actual disk apparatus and memory according to a template controlled by the program.

A logical disk apparatus constructed according to step 608 and management information of stripe-constructed disk apparatus, shown in FIG. 5 and FIG. 6, are explained as follows. FIG. 5 includes a logical volume name 701 of a logical disk apparatus, which is accessed by the logical volume name 701 from an application program. A volume size 702 shows a volume size of the logical disk. A volume type 703 shows a volume type of the logical disk which is 4 WAY stripe construction in the present example. A usage region 704 shows a disk apparatus constructing stripes and areas of the disk apparatus, which are respectively specified by the names, c0t0d0-0, c1t0d0-0, c2t0d0-0 and c3t0d0-0. In order to be easily understood, a disk apparatus is specified by c0t0d0-0, and an area number is specified by −0. However, they are logical expression, but not identify the addresses on the hardware. Further, FIG. 6 shows area information of disk apparatus shown by usage region 704, that is, region information specified by index c0t0d0-0. FIG. 6 includes the region name 801, physical disk name 802 of a physical disk apparatus where the region is arranged, starting offset 803 of the region, region size 804, data arrangement direction 805, stripe width of the region 806.

Next, an operation is explained when an input-output operation is requested to a logical disk apparatus having management information (logical disk construction data 211) shown in FIG. 6 and FIG. 5. When accessing from application program (control program 201 is also a kind of application program) to the present logical disk apparatus, chunk size as input-output size, and an offset value for the logical disk apparatus are given. In other words, the application program can inquire of a volume manager 204 about chunk size beforehand. When volume manager 204 receives the inquiry request, it reports attributes, such as chunk size of the appointed logical disk apparatus. When this input-output processing system receives the input-output request, the system refers to management data, that is, logical disk construction data 211 of the logical disk apparatus, and knows that the logical disk apparatus is constructed by 4 WAY stripe construction as shown in the usage region 704. When the system is informed by the region information that this logical disk apparatus is constructed by stripe, the system calculates how many chunks of the stripes correspond to the offset. For a region arranged reverse direction, in other words, for a reverse directional region, an accumulated total track size which is corresponding to the number of offset chunks from the tail region is regarded as an offset, and the track size is regarded as an input-output size. Then, the system gives an input-output instruction to the respective disk apparatus comprising stripes. For a forward directional region, offset is calculated similarly from the top of the region, and an input-output instruction is given by regarding the size of the track as an input-output size. For all regions constructing a logical disk apparatus, input and output control is started from the far-distant head position of the disk apparatus maintained by the disk driver 205, and input and output operation to the logical disk apparatus is completed after waiting the completion of the all input-output operation to the disk.

As already explained, a truck size of each position inside the region is obtained by the database which this input-output processing system provides for every kind of disk apparatus.

According to this embodiment, a performance collection means collects performance features of disk apparatus connected to the system, by data given by the system manager or by performance measurement means. A logical disk is constructed by logical disk construction means on the basis of the collected data, and the logical disk is operated by logical disk control means. Therefore, response time, needed to input-output per stripe of data of each disk comprising logical disk, is averaged to improve logical disk performance.

When new disk apparatus is introduced into the system, the disk apparatus can collect the performance data 209 by performance measurement means 208, combined with format processing which is always carried out to find bad sectors and to write label information. Therefore, a burden of system manager can be reduced as well as the cost for collecting the performance data 209.

Further, input-output operation of the maximum access time, the minimum access time, and transfer rate of each disk apparatus actually mounted to the system are actually carried out to respective disk apparatus. The response time is measured, and a logical disk is constructed using a table having the measured data. Therefore, the most suitable logical disk apparatus can be constructed.

Further, the logical disk apparatus is constructed, considering data transfer performance of input-output bus and the competition on the same bus which could be factors to prevent input-output performance and synchronous operation of disk apparatus. An operation of the system is carried out by using the data transfer performance of input-output bus and construction data given by system manager, or by combining input-output unit including every disk apparatus connected to a plurality of input-output buses by the performance measurement means. Thereby, the system is loaded, and the response time in input-output operation of each input-output unit is measured. According to the measurement, it is decided whether there is any margin for the data transfer ability in each input-output bus, or in a higher input-output bus to which the input-output bus is connected, or what the limit value of transfer ability is. A disk apparatus having logical disk construction constructed by stripe is selected, by preventing the limit of data transfer ability of the common input-output bus by the data transfer of disk apparatus which is operating in parallel, at input and output to the logical disk apparatus constructed by stripe. Therefore, performance deterioration can be avoided, which is caused by an input-output bus neck at the input-output operation for the logical disk apparatus.

The data per a chunk constructing stripes of logical disk apparatus is arranged to be included in one track of the disk apparatus. Thereby, a means is provided in order to average head seek cost (corresponding to the time for positioning) by the sequential access regardless of the seek direction. Therefore, more flexible disk drive could be constructed, because the difference becomes small even if seeking operation is carried out from outer to inner of the circumference or if seeking operation from inner to outer of the circumference, except disk cash effect at reading out the data.

Further, when a plurality of disk apparatuses having performance difference between inner and outer of the circumference are constructed by stripe, the stripe is constructed so that inner and outer circumference are combined alternately. Thereby, uniform input-output response time can be obtained, regardless of read/write positions of the logical disk apparatus constructed by stripe.

Further, when there are input-output requests to a logical disk apparatus constructed by stripe, instruction order of input-output to all of necessary disk apparatus is controlled in order to finish input-output operation as the logical disk apparatus within the shortest period of time, considering the distance from the present disk head position to the access position requested and input-output size having advantageous performance of disk apparatus constructed by each stripe. Therefore, efficiency of the input-output operation is improved as the logical disk apparatus.

Further, since elements such as WAY number and stripe width comprising a logical disk apparatus are generated automatically, burdens of a system manager is reduced, and the most suitable logical disk is constructed easily.

EMBODIMENT 2

This embodiment carries out a plurality of input-output operations together to the same disk apparatus, when an input-output request is sent by the input-output size including a plurality of chunks to the logical disk apparatus constructed as explained in the first embodiment. This embodiment is based on the assumption that input-output performance of logical disk apparatus could be improved as a whole, if the input-output operation to the logical disk apparatus can finish earlier, by sending a plurality of input-output instructions to the same disk apparatus together at one time, when an input-output request is sent by the input-output size including a plurality of chunks to the logical disk apparatus constructed by stripe.

However, according to disk apparatus constructing a logical disk apparatus, and a priority determination system of the input-output bus connected to the disk apparatus, or characteristics of device driver which drives the disk apparatus, it does not always improve the whole performance to send a plurality of input-output instructions to the same disk apparatus together. In such case, input-output time for a logical disk apparatus is improved by inserting a synchronizing point which synchronizes operation between disk apparatuses positively according to the necessity.

In this embodiment, a data chaining function is needed since a plurality of input-output instructions are gathered into one input-output instruction. This data chaining function is realized, by providing a scattering/gathering function to disk driver 205 and SCSI bus adapter 109 while data are transferred to/from the memory, and using a DMA list.

In a logical disk apparatus explained in the first embodiment, gathering a plurality of input-output instructions does not always improve the performance since the logical disk apparatus includes a region where data arrangement direction is reversed to the seek direction. Therefore, this gathering of input-output instructions is not carried out in the second embodiment. If the logical disk apparatus in the first embodiment is a logical disk apparatus constructed by the step 609 explained in FIG. 4, that is, a logical disk apparatus which equalizes response speed between disks by the stripe width, an input-output bus has enough transfer ability to be regarded as advantageous for this embodiment. Therefore, gathering a plurality of input-output instructions on the same disk apparatus is carried out.

EMBODIMENT 3

Figure 7:
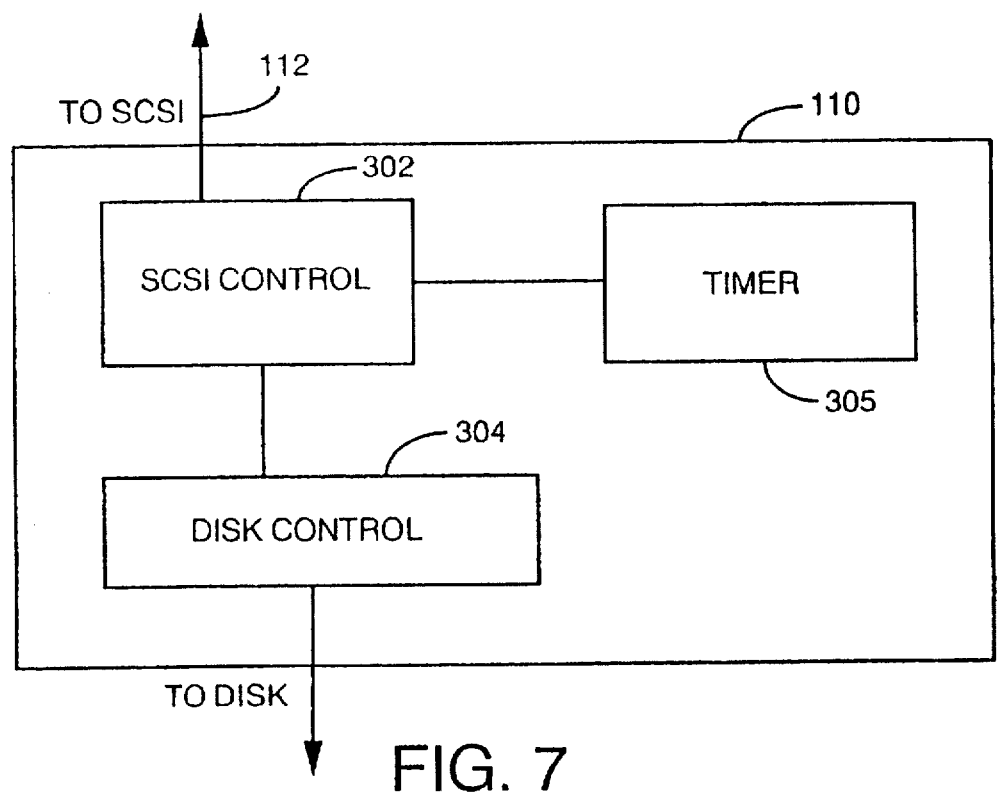
FIG. 7 shows a construction of a disk controller of the present invention.

The third embodiment realizes high-speed processing in an input-output processing system of the present invention. FIG. 7 shows an implementation means which is arranged in disk controller 110. FIG. 7 includes a SCSI control portion 302, a disk portion 304 and a timer portion 305. In this embodiment, the timer portion 305 is arranged in the disk controller 110. However, it is also possible to use the system timer 103 connected to memory bus 104 in place of the timer portion 305.

First, operations of disk driver 205 and disk controller 110 are explained as follows. Disk controller 110 can receive time-out value to be set in timer portion 305 (a part of time limit arrangement means) by SCSI bender unique command (a part of time limit arrangement means), from disk driver 205 via SCSI bus adapter 109, and SCSI control portion 302. After the time-out value is set in a count register (not shown in FIG. 7) inside the timer by the command, the timer starts counting down as soon as it receives read or write command from an initiator (generator of command). When the count register indicates zero, timer portion 105 stops counting down and reports to SCSI control portion 302 that the counting value became zero. Receiving this report, SCSI control portion 302 asserts abort lines of controller internal bus. What kind of phase it might be, disk control portion 304 records a interruption time phase and transferred data quantity into an internal register (not shown in FIG. 7) which could be referred from SCSI control portion 302 before it stops the operation. If SCSI control portion 302 is disconnected from SCSI bus 112, it moves to a status phase after reconnecting from the initiator, and sends the transferred data quantity (status information) as a message. If the timer is still in operating when the whole data transfer is completed, SCSI control portion 302 resets the count register to zero.

Next, operations of this embodiment are explained in detail. Disk driver 205 operates as follows when the time-out value is set. When demanding time-out operation at data transfer to disk driver 205, user program of disk driver 205, that is, data transfer driver 203, or volume manager 204 in this embodiment, sets a time-out value by using the field of block device control table which is common to the system (a table for controlling a device which transfers data by block unit as disk apparatus do), where disk driver 205 could be used freely when disk driver 205 calls data transfer subroutine. When the time-out value is set, disk driver 205 transmits the time-out value and makes a request for sending the above mentioned bender unique command to SCSI bus adaptor 109 before disk driver 205 makes a request for sending a read/write command to SCSI bus adaptor 109. After a request for sending and the read/write command to SCSI bus adaptor 109 is completed, the disk driver 205 becomes a sleeping condition until the completion of processing is notified by interruption from SCSI bus adaptor 109. After being notified the completion of processing, disk driver 205 resets the time-out value in the above mentioned control table to zero, and reports the transferred data quantity as the data transfer quantity (status data) which is prepared in the control table.

Next, a concrete example of the embodiment which is applied to a logical disk apparatus constructed by stripe is explained as follows.

By the way, an input-output processing system in the present embodiment uses a disk apparatus constructed by stripe in order to accelerate the processing speed by control program 201, provides high-speed device 108 with data, and writes an output data from high-speed device 108 into a logical disk apparatus. In order to utilize the processing ability of high-speed device 108 effectively, it is considered that reducing latency before processing starts is more significant than data quantity actually transferred, especially when the data transfer is started. Since a large quantity of data is originally dealt with, the whole performance is not influenced by increase the number of input-output operation.

Control program 201 provides a time-out value and input-output size to a logical disk apparatus constructed by stripe via data transfer driver 203 as required. When the volume manager 204 receives the time-out value via the above mentioned block device control table, the volume manager 204 sets the time-out value received from data transfer driver 203 into a time-out field of the control table prepared in each disk apparatus, when input and output of the disk apparatus constructed by stripe is started.

Figure 8:
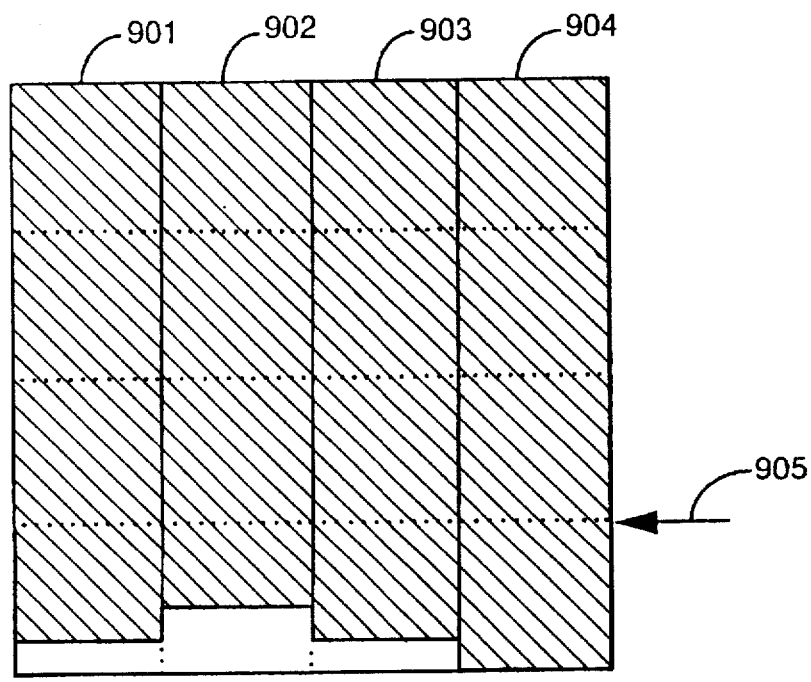
FIG. 8 shows an example of operation status of a logical disk apparatus of the present invention.

FIG. 8 shows a state such that the volume manager 204 synchronizes with the four disk apparatus after time-out is happened and receives data transfer quantity from each disk apparatus, when the volume manager 204 sets a time-out value and reads out the logical disk apparatus constructed by stripe using four disk apparatus. FIG. 8 includes a first disk apparatus 901, a second disk apparatus 902, a third disk apparatus 903 and a fourth disk apparatus 904. The vertical direction of respective disk apparatuses shows a data transfer flow of each disk apparatus. The horizontal dotted line shows data quantity of one chunk of the logical disk. Accordingly, in this example, four chunks of data has been transferred to a logical disk apparatus constructed by stripe as an input-output size.

In an input-output processing system of the present invention, a plurality of instructions to the same disk apparatus could be gathered if possible and effective, as already explained in the second embodiment. In this FIG. 8, four chunks of input-output instructions are transferred together to each disk apparatus, and a time-out value is transferred to the input-output instructions.

As already explained, disk driver 205 and SCSI bus adaptor 109 have data tuning functions. Therefore, there is no problem even if memory address of destination or source is not continuous (in FIG. 8, assuming that flat surface is memory spaces, then the horizontal direction is continuous).

Transfer state of each disk apparatus 901-904 shown in FIG. 8, after volume manager 204 synchronized with the four disk apparatuses, are not filled except the fourth disk apparatus 904 after time-out is happened. However, since any disk apparatus has completed data transfer until the third chunk shown in 905, the volume manager 204 reports to the data transfer driver 203 that three chunks of each data transfer have been completed. This embodiment shows that there is a possibility that data quantity becomes zero if the time-out setting is too short. Therefore, it is effective for users to give a plurality of chunks of logical disk apparatus which sends input-output request as an input-output size, and give a proper corresponding time-out value.

Although, the input-output operation is completed by setting time limit in this embodiment, almost all data transfers are synchronized as shown in FIG. 8.

When read/write is carried out by input-output size of a plurality of chunks, if gathering inputs and outputs to the same disk apparatus constructed by stripe together is not carried out because of its effectiveness, volume manager 204 synchronizes with every chunks one by one between disk apparatus. When input-output instructions are sent to every disk apparatus, an upper appointed time-out value is set. However, when the input-output is sent after the second chunk, and the passing time is measured by a system timer, from the time when sending the input-output instruction of the first chunk to the time when completing the synchronization. The passing time is reduced from the time-out value, and the reduced time-out value is set as a time-out value when the input-output instruction of the second chunk is sent. Hereafter, this is repeated until the time-out value becomes zero. An example of time setting by using SCSI bender unique command is shown in this embodiment. However, bender unique command does not always have to be used, nor does SCSI interface.

As described above, in the present embodiment, a time limit setting means are arrange which sets time limit of input-output operation, and a completion means are arranged which complete the input-output operation when the time limit is over. If the predetermined time limit is over before completion of input-output operation of the predetermined data quantity, then input-output operation is completed, and transferred data quantity during the limited time is reported at the time. Therefore, processing delay caused by waiting for input-output synchronization could be avoided.

The input-output control apparatus includes timer function, a means for completing input-output operation, and a status report means at input-output interrupting (report of transferred data quantity). Therefore, the function is easily realized.

In a logical disk apparatus comprising a plurality of disk apparatuses, in case of operating these plurality of disk apparatus in parallel, synchronization of completion of input-output between the disk apparatus is taken by setting time limit of input-output operation. Thereby, input-output processing for this logical disk apparatus can be completed until the time desired by a user. In other words, the system sends input-output instruction to each disk apparatus comprising a logical disk apparatus by setting the same time limit given from the upper process. When the input-output operation is completed and response is received from every disk apparatus, input-output operation completion statuses of respective disk apparatuses are reported together to the upper process. Thereby, although completion states of input-output operation of respective disk apparatus may be different from each other, however, it is possible to complete input-output operation for a logical disk apparatus until the time user desired.

Further, a synchronizing method explained in this embodiment is applied to a logical disk apparatus constructed by stripe, as a synchronizing method between a plurality of disk apparatus. Thereby, the response time of input-output operation to a logical disk apparatus is guaranteed by the time limit. At the same time, if small difference of completion status of input-output operation is set, that is, appropriate data quantity according to the response time is set, input-output operation gets more likely to be completed in every disk apparatus.

EMBODIMENT 4

This embodiment provides further realization for high-speed processing in an input-output processing system of the present invention. In the fourth embodiment, a mechanism for carrying out high-speed data transfer between input-output units is explained, in the input-output systems explained in the above mentioned embodiments 1~3.

Conventionally, when data are transferred between the input-output units, data is read from the transferring source into data space of user program which carries out data transfer control, and the read data is written in the apparatus of the transfer destinations. The memory space of user program, controlled by the memory of the system, which has given a burden to memory control of the system during the data transfer. DMA operation sometimes may not be carried out from the devices at the data space of user program, which has made the data transfer rate decreased. It is possible to prevent performance deterioration caused by giving burden to memory control, by transferring the data of this memory space by allocating buffer memory area, to which the data is transferred, and which is not concerned with the system, on a physical memory of the system, and by controlling from control process which is carried out in kernel space.

Figure 9:
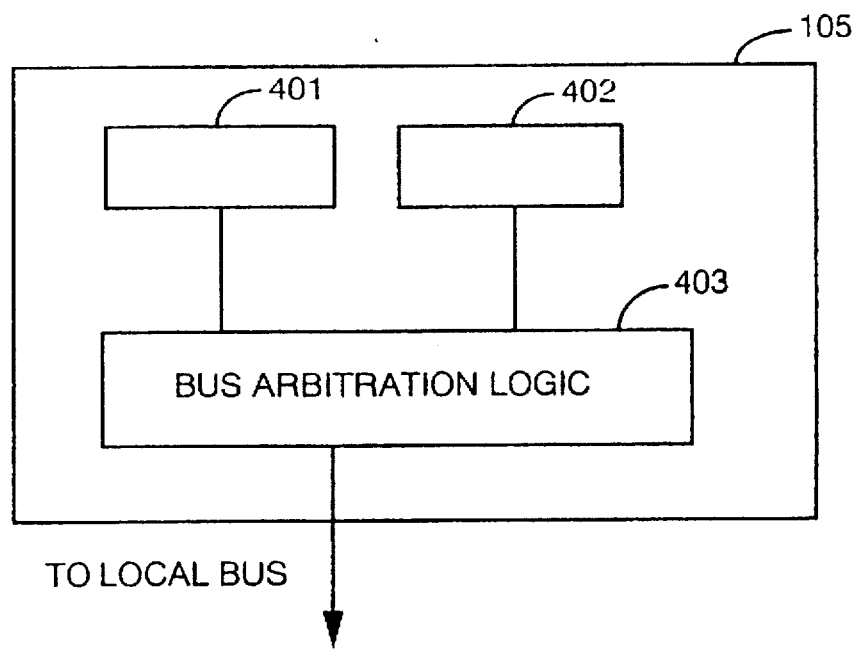
FIG. 9 shows a construction of a bus arbiter of the present invention.

FIG. 9 shows an example of bus arbiter 105 for realizing this high-speed transfer between devices which do not contain logical disks. In FIG. 9, source register 401 and destination register 402 are respectively are mapped at the memory space on the system, where ID on local bus 107 of high-speed device 108 is registered. Bus arbitration logic circuit 403 controls local bus.

Figure 10:
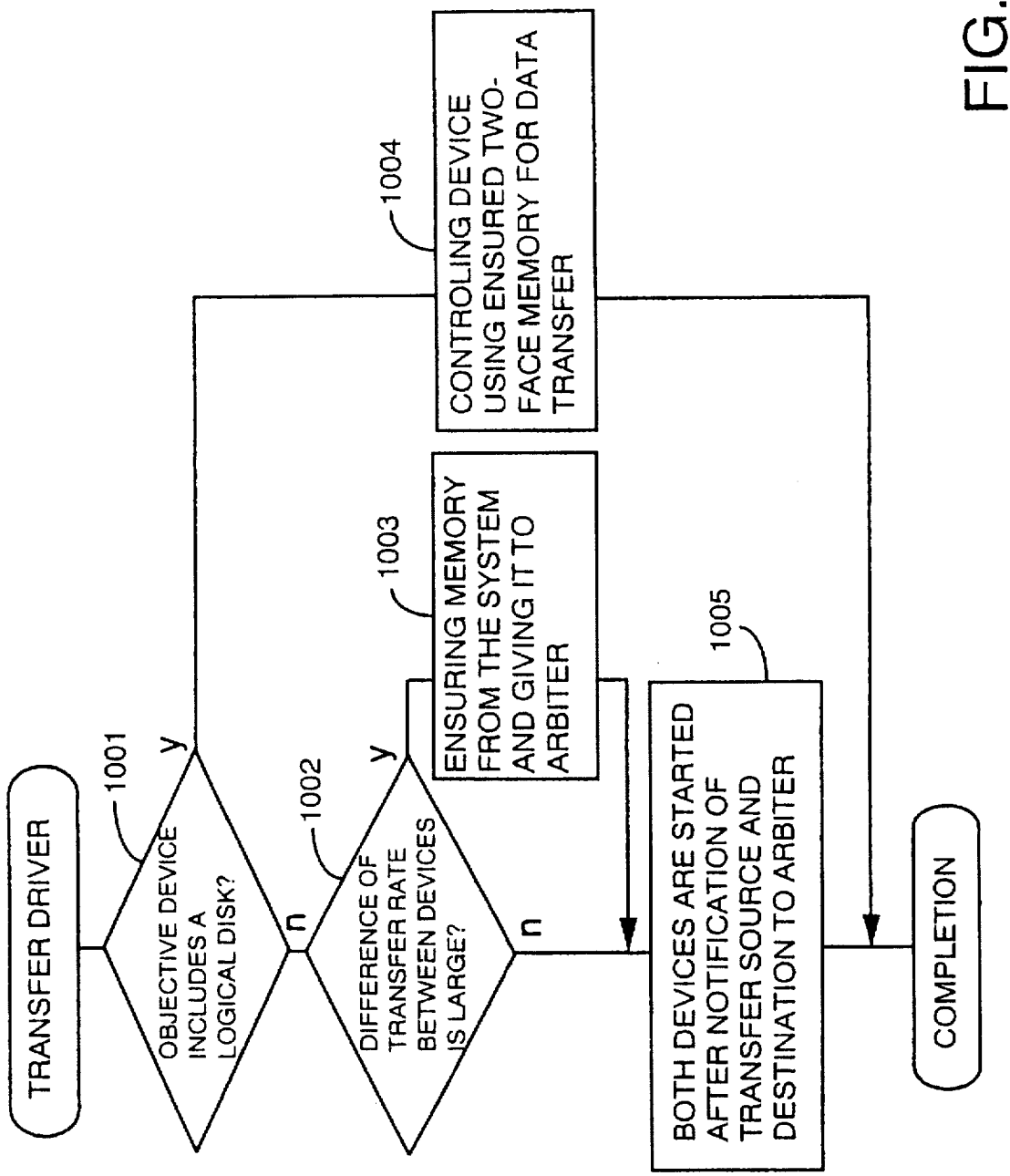
FIG. 10 shows a flowchart of processes of data transfer driver of the present invention.
Figure 11:
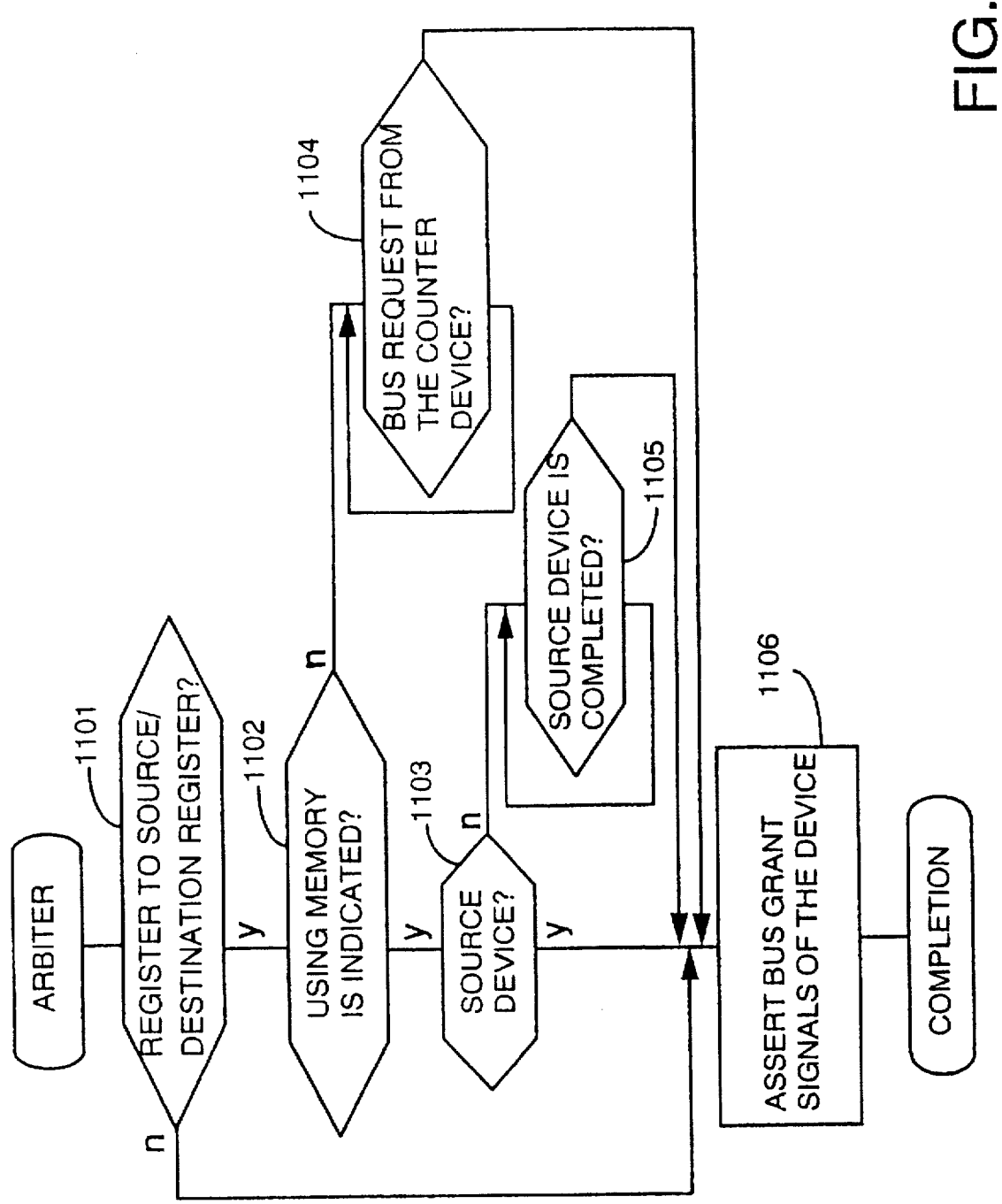
FIG. 11 shows a flowchart of processes of bus arbiter of the present invention.

FIG. 10 is a flow chart which shows a process how data transfer driver 203 carries out high-speed transfer between input-output units except a logical disk. FIG. 11 is a flow chart which shows a process how bus arbiter 105 carries out high-speed transfer between input-output units including a logical disk.

When control program 201 supplies a transfer source device, classification thereof, a data offset, a transfer destination device, a classification thereof, a data offset, and transfer data quantity, the data transfer driver 203 operates according to the logic shown in a flow chart of FIG. 10. The operation of the data transfer driver 203 is explained referring to FIG. 10. In step 1001, data transfer driver 203 judges whether logical disk apparatus is included or not in the source device or destination device, by the device classification (any of an ordinary device, a high-speed device, or a logical disk apparatus) received from control program 201. If a logical disk apparatus is included, a data transfer function of bus arbiter 105 is not utilized because an interface is not arranged in bus arbiter 105 of a volume manager and disk driver. Instead, the device is controlled in step 1004 utilizing memory 102 in the system which is controlled by data transfer driver 203, and device drivers (disk driver 205, high-speed device driver 206).

A process shown in step 1004 is explained as follows. By the way, data transfer driver 203 keeps a static memory area for data transfer processing on the system. This memory is kept as a page, for example, continuously on 2 MB physical address, which is not an object for paging, when the system is initialized, and mapped on a virtual space as a kernel space. It is utilized for a two-face buffer to carry out data transfer. If the chunk size of a logical disk apparatus constructed by stripe is 128 KB, it is possible to assign an input-output size of 8 chunks. This processing is characterized by carrying out asynchronous double buffer processing in one context provided by control program 201. A logical disk apparatus is controlled by volume manager 204, and controls input and output of a plurality of disk apparatus having asynchronous interface. However, as already explained, asynchronous devices are mutually synchronized because the input and output result of logical disk apparatus must be synchronously returned to the user. Therefore, when data transfer driver 203 accesses to a logical disk apparatus, it has to call and wait until the processing is completed. Accordingly, in order to carry out asynchronous operation of the two-face buffer, this processing is carried out as follows.

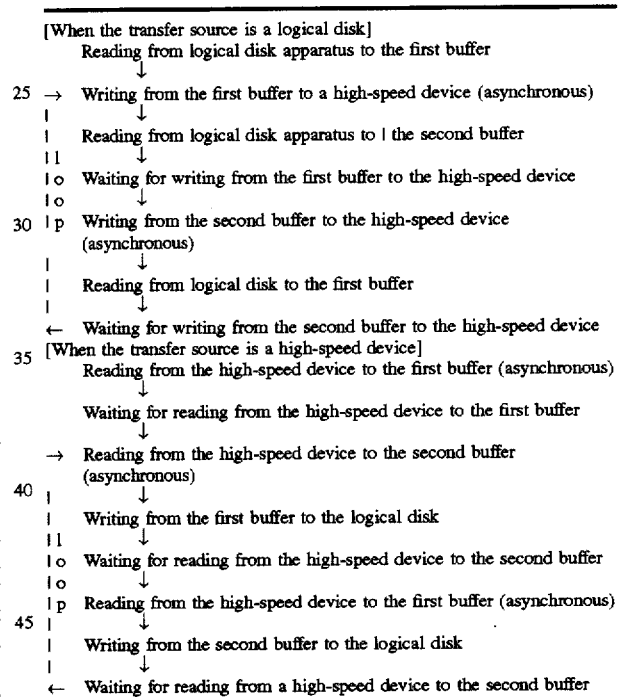

On the other hand, if a data transfer object device does not include any logical/disk apparatus, that is, data transfer between high-speed devices or data transfer between disk apparatus in which disk striping is not effective and high-speed devices. In this case, data transfer is carried out using bus arbiter 105 having data transfer function. The operation of this case is explained as follows. In step 1002, in case where data transfer driver 203 judges that there is no difference of transfer rate between devices, that is, data transfer between high-speed devices, is explained as follows. Since high-speed device 108 has DMA controller, it is possible to carry out data transfer without intervening the memory 102 by handshaking using bus arbiter 105. In step 1005, the data transfer driver registers ID (device address) on the local bus 107 of high-speed device 108 which could be transfer source or transfer destination, to the source register 401 and destination register 402 of bus arbiter 105 mapped in the memory space of the system. Further, the data transfer driver sends a read request to the high-speed device 108 of transfer source by a predetermined input-output size and by an address of unused physical memory space given by the system beforehand. The data transfer driver also sends a size and an address, and sends a write request to high-speed device 108 of transfer destination. Thereby, bus acquisition requests are sent to the bus from two devices. Where, the ID is registered in source register 401 and destination register 402. Further, since any busy bit (this bit is explained below) of memory 102 is not set to source register 401 and destination register 402, the bus arbiter 105 asserts bus grant signals after confirming the transmitting and receiving request signals. Thereby, data transfer is carried out without intervening the memory. After completion of data transfer, data transfer driver clears a source/destination register of the arbiter.

When it is judged that there is no difference of transfer rate between devices in step 1002, in other words, when either of disk apparatus 111 or high-speed device 108 is a transfer source and the other is a transfer destination, data transfer driver 203 keeps area of memory 102, which is continuous but not divided into another pages on the physical address, for input-output size. In step 1003, each ID and memory use bit flag are logically ORed and registered on source register 401 and destination register 402 of bus arbiter 105. After then, in step 1005, data transfer driver 203 gives transfer data size and reserved memory address to both devices of source register 401 and destination register 402, and sends read/write requests to both of them. Since there is an indication of memory use in step 1102, bus arbiter 105 asserts bus grant signals for the bus request from the source device in step 1103, and sends a bit, which means data transfer completion of source device, to source register 401. The device of transfer destination repeats sending bus request until the bus request is accepted. When bus arbiter 105 confirms that data transfer completion bit is ON for bus free and at the data transfer completion of the source device, bus arbiter 105 asserts grant signals in step 1106. Thereby, the destination device writes data of the transfer source, which is transferred to memory 102 reserved for transfer, into own device. Thereby, the data transfer is carries out. After the data transfer is completed, data transfer driver 203 clears source register 401 and destination register 402 in bus arbiter 105, and releases memory 102 which has been reserved for data transfer.

As described above, since a data transfer driver carries out data transfer by keeping two-face buffer for data transfer, it is possible to carry out faster data transfer between input-output units. That is, it is possible to provide a data transfer system which gives little burden to memory control of the system, in other words, which can prevent performance degradation caused by a burden on the memory control of the system.

Further, in this embodiment, the system controls DMA controller arranged in a control unit which controls each input-output unit, and providing a controller at main input-output bus, the controller synchronizes data transfer of respective input-output units on the bus without via any memory. Therefore, it is possible avoid to transfer data to memory unnecessarily.

In order that the control program which carries out data transfer (a data transfer driver) absorbs velocity difference between input-output units, the system reserves memory for data transfer controller (bus arbiter) connected to main input-output bus. Therefore, it is possible for data transfer controller (bus arbiter) to regulate transfer rate between devices utilizing the memory. Accordingly, high-speed data transfer between input-output units can be carried out efficiently.

EMBODIMENT 5

This embodiment is an example of providing data transfer of each device on control local bus 107 which synchronizes the data transfer on the bus without via memory 102, to avoid useless data transfer to memory 102. This is realized by controlling DMA controller of each device in the input-output system constructed in embodiments 1~4, needless to say, DMA transfer rate between devices has to accord with each other. In this embodiment, a logical disk apparatus is often constructed to have four stripe disks in each different disk apparatus on each SCSI bus. However, arrangement of a logical disk apparatus often needs to be changed in order to arrange data. If a disk apparatus corresponding to data transfer destination is on the same SCSI bus, volume manager 204 sends copy command of SCSI to all stripe disk apparatuses as a copy destination. This makes it possible to change the data arrangement of a logical disk apparatus.

This fifth embodiment is applied to, for example, a system which is constructed by a plurality of logical disk apparatus constructed by stripe, where a plurality of SCSI buses are connected to a main input-output bus (local bus), a plurality of logical disk apparatus are connected to each SCSI bus, and every SCSI bus is connected to a single disk apparatus.

In such a system, two logical disk apparatuses are connected to the same bus with the same stripe width. Therefore, when data transfer between logical disk apparatus is required, the disk apparatus connected the same bus uses a copy command of SCSI between the corresponding stripes. In the system, since data transfer is carried out between these two logical disk apparatus, high-speed data transfer which gives little burden to the system can be realized. The embodiment can also be applied to different kinds of input-output units having a high-speed device which is provided by a plurality of input-output ports which has a SCSI controller function.

In the above mentioned respective embodiments, SCSI is explained as an example of an input-output interface. However, an interface does not need to be SCSI especially. Needless to say, other kinds of interface could be used.

In the fifth embodiment, copying between disk apparatus is explained using a COPY command of SCSI. However, if a function corresponding the COPY command of SCSI can be realized in disk control units, it could be used for copying between disk apparatuses.

What is claimed is:

1. An input-output processing system for inputting and outputting a large quantity of data comprising a logical disk control means, said logical disk control means comprising:

a performance data collection means for collecting data from performance data where performance characteristics of a plurality of disk apparatus constructing input-output system are given by a system manager or from direct measurement of the performance by operating said disk apparatus;

a logical disk construction means for constructing a logical disk apparatus using said plurality of disk apparatus on the basis of performance data collected by said performance data collection means, where said logical disk construction means forms logical disk management data so that the stripe width is set in order to equalize response time needed for input and output corresponding to one stripe data of each disk apparatus constructing said logical disk apparatus; and said logical disk control means controls said logical disk apparatus by said logical disk management data.

2. An input-output processing system for inputting and outputting a large quantity of data of claim 1, further comprises a time limit setting means for setting a limit time required to operate said input-output unit at sending input-output instruction to input-output units; and a means for completion of input-output operation which is started by said input-output instruction when the set time limit passed.

3. An input-output processing system for inputting and outputting a large quantity of data of claim 2, further comprises a timer for setting time set by said time limit setting means;

a means for completing input-output operation by receiving time expiration information from the timer.

4. An input-output processing system for inputting and outputting a large quantity of data of claim 2: wherein said input-output unit is a logical disk apparatus comprised of a plurality of disk apparatus.

5. An input-output processing system for inputting and outputting a large quantity of data of claim 1, further comprises a time limit setting means for setting limit time in relation to a processing of an input-output instruction at sending input-output instruction to input-output units; and a processing completion means for completing input-output operation which is started by said input-output instruction when the set time limit is expired.

6. An input-output processing system for inputting and outputting a large quantity of data of claim 1: wherein said performance measurement means performs an input-output instruction to measure the response time by setting conditions in which the response time for each disk apparatus is the shortest or longest.

7. An input-output processing system for inputting and outputting a large quantity of data of claim 1: wherein said performance measurement means carries out performance measurement of the disk apparatus as a part of initialization process to the disk apparatus when disk apparatus are added to the system.

8. An input-output processing system for inputting and outputting a large quantity of data of claim 1: wherein said performance data collection means collects bus performance data by construction of input-output bus which a plurality of disk apparatus are connected to, system construction data to which the system manager gives bus transfer performance, or actual operation of an input-output unit connected to said bus by said performance measurement means;

said logical disk construction means constructs a logical disk apparatus on the basis of this collected performance data considering bus transfer performance connected to each disk performance.

9. An input-output processing system for inputting and outputting a large quantity of data of claim 1: wherein in said logical disk construction means, data transfer quantity for every input-output instruction assigned to disk apparatus comprising logical disk apparatus is arranged in one track of the disk apparatus.

10. An input-output processing system for inputting and outputting a large quantity of data of claim 1: wherein said logical disk construction means equalizes apparent input-output performance of a logical disk apparatus no matter where the data is placed on the disk apparatus, by alternate combination of inner and outer of circumferences of respective disk apparatus, if the logical disk apparatus is constructed by a plurality of homogeneous disk apparatus whose performance is different between inner and outer of circumferences.

11. An input-output processing system for inputting and outputting a large quantity of data of claim 1: wherein when an input-output request is sent to a logical disk apparatus, said logical disk control means dynamically judges the state of head position of disk apparatus shortly before sending an input-output instruction to every disk apparatus constructing the logical disk apparatus, and sends the input-output instruction so that a time for carrying out input and output to the logical disk apparatus becomes shortest.

12. An input-output processing system for inputting and outputting a large quantity of data of claim 11: wherein when an input-output request is sent to a logical disk apparatus using an input-output size in which a plurality of input-output requests are generated to each of a plurality of disk apparatus;

said logical disk control means judges performance characteristics of disk apparatus comprising this logical disk apparatus and characteristics of input-output bus which is connected to a disk, and decreases frequencies for sending a plurality of input-output instructions to the same disk apparatus, according to the necessity.

13. An input-output processing system for inputting and outputting a large quantity of data of claim 11: wherein when an input-output request is sent to a logical disk apparatus using input-output size in which a plurality of input-output requests are generated to each of a plurality of disk apparatus;

said logical disk control means sends the input-output instruction so that the input-output time to the logical disk apparatus becomes shortest by arranging a synchronizing point in the input-output request to these plurality of disk apparatuses.

14. An input-output processing system for inputting and outputting a large quantity of data of claim 1: wherein said logical disk control means automatically constructs a logical disk apparatus which satisfies the performance given by the system manager.

15. An input-output processing system for inputting and outputting a large quantity of data of claim 1, further comprises a data transfer driver for carrying out data transfer control to input-output units, said data transfer driver carries out data transfer by ensuring two-face buffer on the system memory, when an apparatus for sending the input-output instruction includes a logical disk apparatus.

16. An input-output processing system for inputting and outputting a large quantity of data of claim 15, further comprises a bus arbiter for controlling input-output bus connected to an input-output unit;

said bus arbiter comprises a source register and a destination register for registering data transfer source ID and data transfer destination ID, respectively; and said data transfer driver carries out data transfer without using system memory by driving said bus arbiter when an apparatus for sending the input-output instruction does not include a logical disk apparatus.

17. An input-output processing system for inputting and outputting a large quantity of data of claim 15: wherein said data transfer driver drives said bus arbiter by ensuring buffer for data transfer on the system memory, when there is difference of data transfer rate between input units and output units which are appointed by an input-output instruction.

18. An input-output processing system for inputting and outputting a large quantity of data of claim 1: further comprising a plurality of disk apparatus comprising said logical disk apparatus which are connected to different input-output buses to construct a plurality of logical disk apparatus, further comprising a copy means arranged between disk apparatuses connected to the same input-output bus at a disk control apparatus for controlling respective disk apparatus connected to said respective input-output buses, in order to carry out data copy between different logical disk apparatus.

* * * * *